(12) United States Patent
Bean, II

(10) Patent No.: US 8,125,674 B2
(45) Date of Patent: Feb. 28, 2012

(54) SYSTEM AND METHOD FOR PARTIAL JOB INTERRUPT OF NORMAL ORDER OF JOB QUEUE OF MARKING SYSTEMS

(75) Inventor: Lloyd F. Bean, II, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1299 days.

(21) Appl. No.: 11/495,017

(22) Filed: Jul. 28, 2006

(65) Prior Publication Data

US 2008/0030761 A1 Feb. 7, 2008

(51) Int. Cl.
*G06K 15/00* (2006.01)
*H04N 1/00* (2006.01)

(52) U.S. Cl. ......................... 358/1.16; 358/1.9

(58) Field of Classification Search ................ 358/1.14, 358/1.13, 1.15, 1.16, 1.9
See application file for complete search history.

(56) References Cited

U.S. PATENT DOCUMENTS

| | | | | |
|---|---|---|---|---|
| 5,179,637 | A * | 1/1993 | Nardozzi | 358/1.15 |
| 5,774,356 | A * | 6/1998 | Hisatake et al. | 700/28 |
| 5,970,223 | A * | 10/1999 | Debes et al. | 358/1.16 |
| 7,095,528 | B2 * | 8/2006 | Barry et al. | 358/1.6 |
| 2005/0270573 | A1 * | 12/2005 | Ferlitsch | 358/1.15 |
| 2005/0275875 | A1 * | 12/2005 | Jennings, Jr. | 358/1.15 |

OTHER PUBLICATIONS

U.S. Appl. No. 11/157,598, filed Jun. 21, 2005, Neil A. Frankel.

* cited by examiner

*Primary Examiner* — Benny Tieu
*Assistant Examiner* — Sunil Chacko
(74) *Attorney, Agent, or Firm* — Fay Sharpe LLP

(57) ABSTRACT

A method and system is provided for partial job interrupt of an on-going first print job to cause a contemporaneous parallel printing of a second print job. A plurality of marking engines associated with the storage device for receiving and storing a plurality of print jobs in queue, executes a first print job and outputs the sheets to an assigned first sheet output. A user determines that a second print job sent to the system and stored in the queue behind the first print job will be undesirably delayed and so interrupts the first print job by limiting the executing of the first print job to less than all of the plurality of print engines within the printing system. An output of the first print job is maintained at the first job sheet output. The second print job can then be contemporaneously executed with the execution of the first print job with available print engines interrupted from the first print job. Second print job sheets are outputted contemporaneously at a second sheet output with the output of the first print sheet jobs. The partial job interrupt is effected at the printing system upon detection by user of a delay in the printing of the second print job. The limiting of the executing of the first print job could also be effected by contemporaneously applying images of the first print job and the second print job to the photoreceptor of a one of the marking engines.

12 Claims, 4 Drawing Sheets

SYSTEM AND METHOD FOR PARTIAL JOB INTERRUPT OF NORMAL ORDER OF JOB QUEUE OF MARKING SYSTEMS

BACKGROUND

The present exemplary embodiments broadly relate to the art of marking systems including multiple parallel operating print-engines and, more particularly, to a method and system for ordering a job queue of a marking system. Such embodiments find particular application and use in association with maximizing productivity and utilization of redundant capabilities of multi-engine marking systems, and is discussed herein with particular reference thereto. However, it is to be understood that the present exemplary embodiments are capable of broad use and may be amenable for use in other applications and environments, including single-engine marking systems.

It is well understood that image marking systems of a great variety of types, kinds and configurations can receive, process and output a significant quantity of print jobs over the course of a normal period of operation. As such, it is common for numerous print jobs to be sent electronically from remote work stations and stored in queue for processing by an associated marking system at any given time. Thus, many such image marking systems include a memory or storage component that receives and holds the print jobs and/or data associated therewith prior to being released for processing and actual printing by the image marking system. In some alternate arrangements, such a job processing queue can be provided by an associated computer system or network.

Known printing systems typically process print jobs from the job queue in the order that they are received by the printing system. Normally, this is done without taking into consideration the state of the printing system itself, the components thereof or a user's desire to prioritize a job in the queue. As a result, the printing system might be incapable of outputting certain print jobs in the print queue when a user may seriously need the output.

A particular problem or nuisance can occur when a user, after having sent a print job to the printing system from a remote personal computer station, goes to the system to retrieve the sheet output, only to find that a rather large and time consuming preceding print job is the only one that is printing out. There is thus a need for a control system to allow the user, particularly in a multiple marking engine system, to somehow change the job queue in the memory, to prioritize the user's job while the user is at the printing system, and thereby avoid the nuisance of having to leave and return at a time when the large preceding print job is hopefully done, and the user's job has finally been printed out.

There is also a need for such a system that can print out the prioritized job for the user, without substantially delaying the print out of a preceding job, so that such a partial job interrupt of the preceding job is not apparent to the author/printer of the preceding job.

CROSS REFERENCE TO RELATED PATENTS AND APPLICATIONS

The following applications, the disclosures of each being totally incorporated herein by reference are mentioned:

U.S. application Ser. No. 11/157,598, filed Jun. 21, 2005, entitled "METHOD OF ORDERING JOB QUEUE OF MARKING SYSTEMS", by Neil A. Frankel.

BRIEF DESCRIPTION

According to aspects illustrated herein, there is provided a method for scheduling printjobs in a parallel printing assembly having a plurality of print engines, a storage device for storing print jobs in queue and a printer assembly output having a plurality of sheet outputs wherein a user initiates a partial job interrupt at a local user interface at the printer assembly output. The first print job is executed in the parallel printing system wherein printed sheets of the first print job are output at a first one of the plurality of sheet outputs. A second print job is sent to the parallel printing assembly wherein the second print job is queued behind the first print job. A user who desires receiving the second print job immediately, interrupts the first print job by limiting the executing the first print job to less than all of the plurality of print engines, while maintaining the limited first print job output at the first one of the plurality of sheet outputs. The second print job is executed contemporaneously with the executing of the first print by printing the second print job with available engines interrupted from the first print job. Sheets of the second print job are output at a second one of the plurality of sheet outputs whereby the user initiating the second print job may receive the second print job output sheets prior to completion of the first print job.

According to other aspects illustrated herein, the printing system has an output comprising a plurality of sheet outputs. A user interface locally disposed to the system output includes a user-activated controller for selectively interrupting an on-going print job comprising limiting the parallel printing of the on-going print job to less than the plurality of marking engines. A second print job is printed with marking engines made available from the interrupting of the on-going print job. The on-going job and the second print job are output at distinct ones of the plurality of sheet outputs.

According to other aspects illustrated herein, the printing system limits the parallel printing of the on-going print job by interleaving images of the second print job with the on-going print job. Such interleaving is achieved by contemporaneously applying images of both the on-going print job and the second print job to a photoreceptor or transfer belt of one of the marking engines.

DETAILED DESCRIPTION

The terms "printing" and "marking" as used herein are to be broadly interpreted to encompass an action or activity regarding the output or production of a sheet of media having text, images, graphics or other indicia formed thereon, alone or in any combination.

Similarly, the terms "print," "printer," "printing engine," "printing system," "marking engine" and "marking system" as used herein are to be broadly interpreted to encompass any apparatus that outputs a sheet of media having text, images, graphics and/or other indicia formed thereon, alone or in any combination.

Additionally, such text, images, graphics and/or other output indicia can be formed on sheet media of any type or form, such as paper or polymeric film, for example. Furthermore, such text, images, graphics and/or other output indicia can be formed using any printing or marking substance, such as ink, toner or colorant, for example, in monochrome (e.g. black) or one or more colors, or any combination thereof.

What's more, the terms "logic circuit," "logical circuitry," "controller" and/or other similar terms as used herein are to be interpreted broadly to encompass any system, apparatus, process and/or algorithm that is capable of processing inputs and returning a result or output. For example, these can include, without limitation, discrete electrical or electronic circuitry, electronic components, processors or other hardware, firmware, software, or any combination the foregoing.

Figure 1:
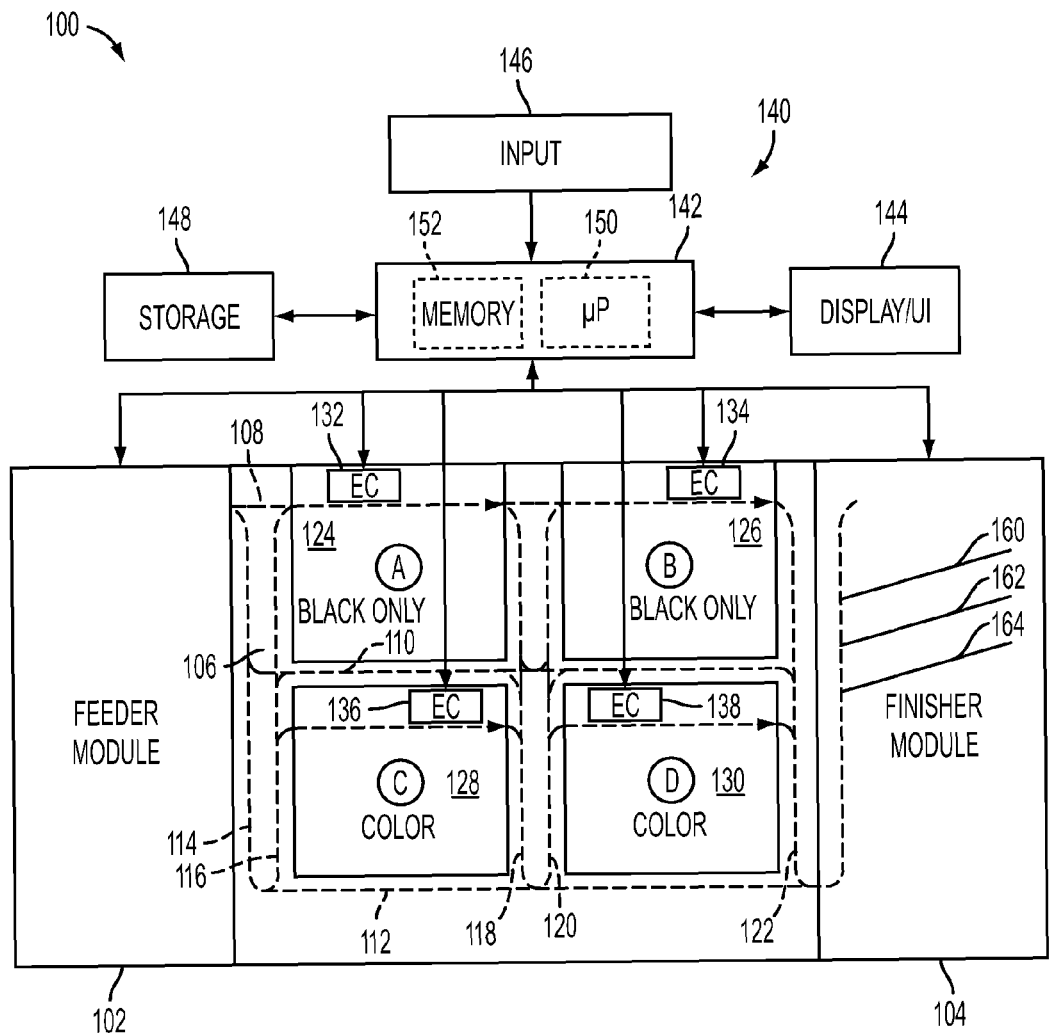
FIG. 1 is an elevated view of a multiple engine marking system.

A printing system comprised of multiple marking engines can process any suitable number of print jobs over the course of a period of operation, and that any number of such print jobs may be in queue for release to the one or more marking engines at any one time. FIG. 1 illustrates an exemplary marking system 100 that includes a media input or feeder module 102 and a media output or finisher module 104. A media pathway 106 extends between the media input and the media output. Media pathway 106 includes a first or upper highway 108, a second or intermediate highway 110 and a third or lower highway 112. The highways are interconnected by vertical pathways 114, 116, 118, 120 and 122. Marking system 100 also includes marking engines 124, 126, 128 and 130. In the embodiment shown in FIG. 1, marking engines 124 and 126 are indicated as being monochrome (e.g. black) marking engines, and marking engines 128 and 130 are indicated as being color (e.g. cyan, magenta, yellow and black) marking engines. The marking engines are interconnected with highways and/or vertical pathways in a conventional manner. Such a printing system has been referenced as a "Tightly Integrated Parallel Printing ("TIPP") system.

Printing systems having multiple marking engines can often run or otherwise produce any one or more print jobs in a number of ways, depending upon the redundant capabilities of the printing system.

It will be appreciated that marking engines 124-130 are of a generally typical construction and function in a manner consistent with known xerographic principles of operation. The marking engines respectively include engine controllers 132, 134, 136 and 138 that are in operative association with typical components of the marking engine, such as a charging component or system, an exposure component or system, a developer component or system, a transfer component or system, a photoreceptor cleaning component or system and/ or a fuser component or system, for example.

Figure 2:
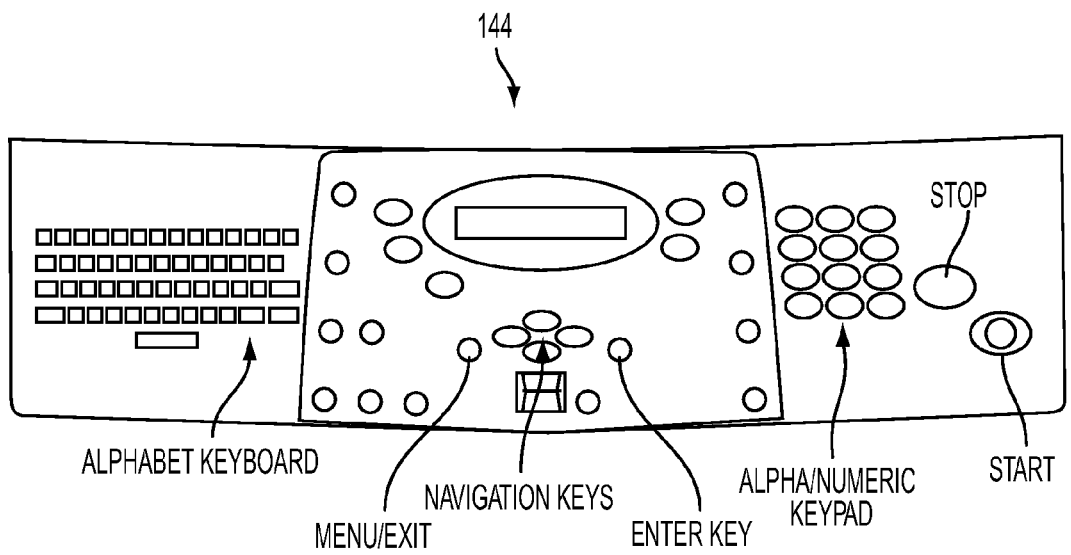
FIG. 2 is a user interface employed in the exemplary embodiment of FIG. 1.

Marking system 100 also includes a control system 140 that coordinates operation of the various systems and/or components of marking system 100. Control system 140 includes an electronic control unit or supervisory controller 142 and a user interface 144 (FIG. 2) in communication with supervisory controller 142. Additionally, control system 140 includes an input interface 146 and a storage device 148, each of which is in communication with supervisory controller 142. Input interface 146 can include and/or be in communication with any suitable input devices, such as remote personal computer stations, or systems for delivering print jobs and/or data associated therewith to marking system 100 through supervisory controller 142. Exemplary input devices and/or systems can also include image scanning devices, memory card readers, stand-alone computers and/or computer networks. Storage device 148 receives print jobs and/or data associated therewith from supervisory controller 142 and stores the same in queue prior to being released for production as printed documents.

Supervisory controller 142 is in communication with feeder module 102, finisher module 104 and engine controllers 132-138 and, thus, is typically responsible for releasing queued print jobs from the storage device and routing the same through the pathways, marking engines and other components of the marking system to produce the printed documents. In addition to sending instructions to the other components and systems, supervisory controller 142 can receive instructions, data and other signals from the other systems and components, such as engine controllers 132-138, for example, as well as also perform other functions, such as evaluating print jobs queued for release and organizing or otherwise re-ordering the queued print jobs as may be desired. Thus, supervisory controller 142 can include logical circuitry in any suitable form or configuration for attending to and controlling any or all of such actions and others. In the exemplary embodiment shown in FIG. 1, supervisory controller 142 includes a processing device, such as a microprocessor 150, for example, and a memory device, such as nonvolatile or random access memory 152, for example. Additionally, in one exemplary embodiment, the logical circuitry can take the form of a software program that is stored in a suitable memory device, such as storage device 148 or memory 152, for example, and is executed by a suitable processing device, such as microprocessor 150, for example. However, it is to be understood that other arrangements could alternately be used.

The finisher module 104 includes a plurality of sheet outputs 160, 162, 164, which as will be further detailed below, can be respectively assigned to distinct on-going, contemporaneously executing jobs by parallel printing of job sheets by the plurality of marking engines.

It is to be specifically understood that marking system 100 shown in and discussed with regard to FIG. 1 is merely exemplary of one suitable marking system and that any other printing system of any kind, type or configuration could alternately be used. For example, any number of marking engines could be used, such as from one to twenty marking engines, for example, in association with any arrangement of complimentary media pathways. As another example, the one or more marking engines could be all monochrome, all color or any combination of monochrome and color marking engines in any arrangement or configuration. As a further example, the marking system could optionally include one or more redundant elements, such as fusers separate from the marking engines that are accessible via the highway and vertical media pathways, for example. These could either be used in shared fashion or added to the redundancies of the system.

The illustrated embodiments have applicability in a work group environment where several users utilize the same printing system. A problem which often occurs in this environment is when the user goes to pick up their job at the printer, a large print job is printing at the printer which was submitted by a different user. The present user has to wait until the different user job is finished or pauses the different user job and reorganizes the job queue so that their presently desired job has priority.

Figure 3:
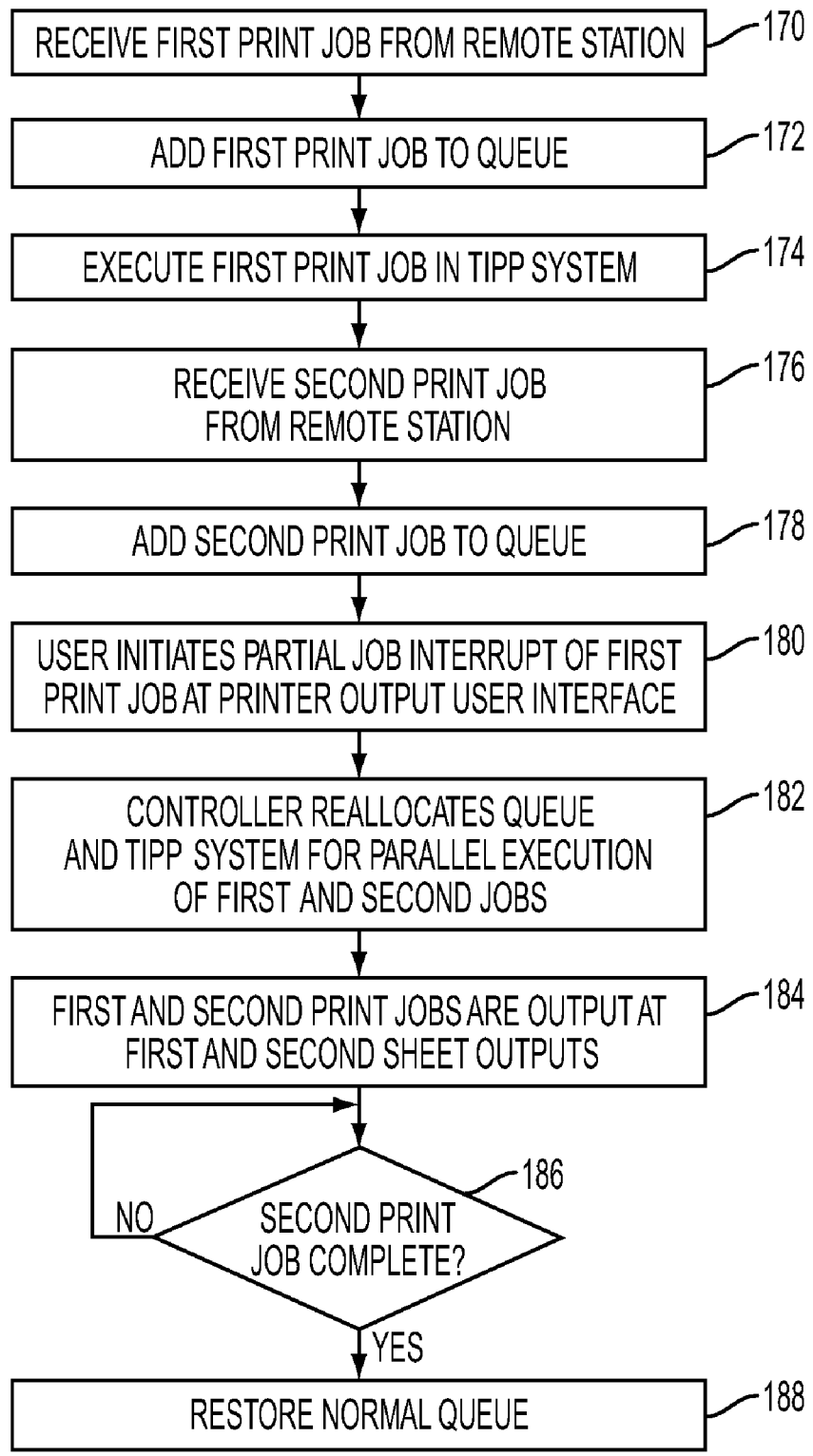
FIG. 3 is a flowchart illustrating an exemplary method of partially interrupting a normal job queue.

With reference to FIG. 3, a flowchart of an exemplary method for overcoming these problems is provided. The first print job is received 170 at marking system 100 from a station remote from the printer 100. The first print job is added 172 to the normal print job queue in storage device 148. The first print job is then executed 174 by the printing system 100 in a manner most expeditious for its completion wherein the print documents are typically output on one of the sheet outputs 160, 162, 164.

A second print job is received 176 from another remote station and it is added to the normal print job queue behind the first print job.

Assuming the first print job is rather a large job which is on-going at the time the second job user arrives to pick up the second job; the second job user will thus have to wait until completion of the first job, or perhaps pause the first job, which could be undesirous to the sender of the first print job. In accordance with the illustrated embodiments, the user interface 144 includes a menu item designated "partial job interrupt", which instruction when initiated by a user, results in supervisory controller 142 interrupting the first print job including limiting the executing of the first print job to less than all of the plurality of print engines 124, 126, 128, 130, while maintaining the limited first printjob output at the corresponding one of the plurality of sheet outputs. In other words, the controller 142 reallocates 182 the normal job queue to bring the second print job to the forefront with the on-going first print job and assigns some of the marking engines to the second print job, while maintaining the executing of the first print job at the other print engines. In other words, the partial job interrupt effectively limits the executing of the first print job to less than all the plurality of print engines while maintaining the limited first print job output at its associated sheet output. The second print job can thus be executed contemporaneously with the executing of the first print job by printing the second print job with the available print engines interrupted from the first print job. The first and second print job outputs are then output 184 at first and second distinct sheet outputs. For example, if the first print job remains on-going with its sheet output 160, the second print job could be sheet output 162. As soon as the second print job is completed 186, the partial job interrupt is also ended and the controller 142 can resume 188 a normal print job queue processing.

For example, if the system 100 were printing a large color job as the first print job, and the second job was a comparatively smaller black and white print job, then the controller 140 would assign one of the black marking engines 124 to the second print job, while all the other engines 126, 128, 130 could continue with the first print job. The author of the first print job would hardly recognize any resulting delay in the completion of the first print job and the second print user, who initiated the partial job interrupt, would have the second print job without having to wait for the completion of the first print job. The method for selecting which marking engine should be assigned may be selectively determinable, but in one system, prioritizing metric efficiencies such as is disclosed in the aforementioned pending application would be practical.

Figure 4:
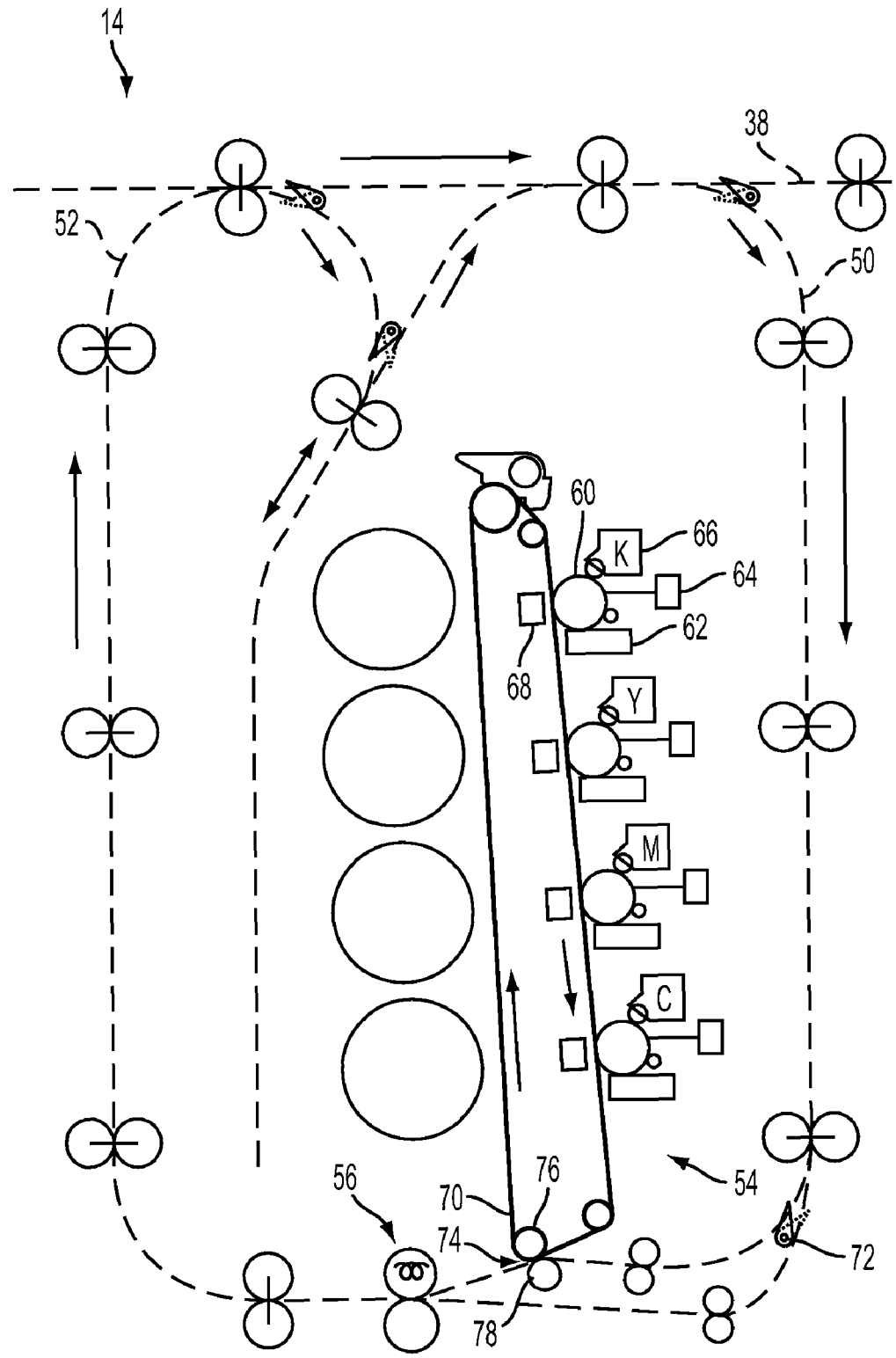
FIG. 4 is an enlarged schematic side view of one of the marking engines of FIG. 1.

With reference also to FIG. 4, which illustrates one of the marking engines 124, 126, 128, 130 by way of example, the marking engines each include an image applying component 54, for applying an image to the print media, and a fixing device 56, for fixing the applied image to the print media. In the case of a xerographic marking engine, for example, the marking engine includes various xerographic subsystems for forming an image, transferring the image to a sheet of paper, and fusing the image to attach the image more permanently to the print media. The marking engine of a xerographic system typically includes a charge retentive surface, such as a rotating photoreceptor 60 in the form of a belt or drum. The images are created on a surface of the photoreceptor. Disposed at various points around the circumference of the photoreceptor 60 are the xerographic subsystems, which include a charging station 62 for one or more of the colors to be applied, such as a charging corotron, an exposure station 64, which forms a latent image on the photoreceptor, such as a Raster Output Scanner (ROS) or LED bar, a developer unit 66, associated with each charging station 62 for developing the latent image formed on the surface of the photoreceptor by applying a toner to obtain a toner image, a transfer unit 68, such as a transfer corotron, transfers the toner image thus formed to the surface of a print media substrate, such as a sheet of paper, or to an intermediate transfer belt. In the illustrated embodiment, each of four toners cyan, magenta, yellow, and black (CMYK) is applied to a separate photoreceptor 60, and the resulting image transferred to an intermediate transfer belt 70. When the marking engine is operating in a normal marking and fixing mode, print media is directed by a switch 72 in pathway 50 to a transfer point defined by nip 74 between rollers 76, 78. At the transfer point 74, the print media is brought into contact with the intermediate transfer belt 70 for transfer of the image to the print media. Thereafter, the imaged print media is conveyed to the fixing device 56.

Photoreceptor 60 or transfer belt 70 are sized to accommodate a plurality of images and as part of another exemplary embodiment, the belt images imparted on them are not limited to a single print job. Where the images comprise an interleaving of the first print job with the second print, both print jobs could be processed contemporaneously within the same marking engine. More particularly, in response to the partial job interrupt command from the user, supervisory controller 142 need not completely cease any one of the marking engines from processing the first print job, but rather, may control the marking engine so as to execute the second print job along with the first print job. Many photoreceptors 60 or known belts 70 can hold as many as eight different images. The reallocating 182 of the job queue would comprise an interleaving process that could assign four of the images to the first print job, and the other four to the second print job, although any apportionment could be employed. Which images are registered to the respective jobs is important so that the printed sheets are properly transported along the media path to the appropriate sheet output.

In yet another exemplary embodiment, a printing system comprised of only a single marking engine could similarly process the subject partial job interrupt by reallocating the job queue with the above interleaving process. Although having only the one marking engine, such a system would include multiple sheet outputs, and a belt 70 sized to accommodate multiple images.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for scheduling print jobs in a parallel printing assembly having a plurality of print engines, a storage device for storing print jobs in queue and a printer assembly output having a plurality of sheet outputs wherein a user initiates a reallocation of the queue at a local user interface at the printer assembly output, comprising:

executing a first print job in the parallel printing assembly, including printing the first print job on all of the plurality of print engines and outputting printed sheets of the first print job at a first sheet output;

sending a second print job to the parallel printing assembly and queuing the second print job behind the first print job;

decreasing the number of the plurality of print engines assigned for executing the first print job to less than all of the plurality of print engines;

executing the second print job contemporaneously with the executing of the first print job including maintaining the printing of the first print job with a first of the plurality of engines while printing the second print job with at least a second of the plurality of engines made available from the decreasing; and outputting sheets from the second print job at a second sheet output, whereby the user initiating the second print job is adapted to receive second print job output sheets prior to completion of the first print job.

2. The method of claim 1 wherein the executing the first print job includes executing a normal print queue of preexisting print jobs, of which the first print job is foremost in the queue.

3. The method of claim 2 wherein the sending the second print job comprises remotely sending electronically the second print job wherein the second print job is added to the normal print queue.

4. The method of claim 3 further including before the decreasing, amending the normal print queue to remove the second print job therefrom for the contemporaneous executing of the second print job.

5. The method of claim 4 further including selectively interrupting the executing of the first print job by the user at the local user interface at the printer assembly output.

6. The method of claim 5 wherein the selectively interrupting includes determining by the user that the executing of the first print job will delay the queued second job for an undesirable amount of time.

7. The method of claim 1 wherein upon completing the executing of the second print job, the executing of the first print job is restored in all of the plurality of print engines.

8. The method of claim 1 further including contemporaneously applying images of the first print job, and images of the second print job, to an image transfer device of one of the print engines.

9. The method of claim 8 wherein the contemporaneously applying images includes interleaving the images of the first and second print jobs, respectively.

10. A xerographic printing system comprising:
a marking engine associated with a storage device for receiving and storing a plurality of print jobs in queue, the marking engine he adapted to hold a plurality of images on a photoreceptor or belt;
a user interface for selectively reallocating printing of the print jobs in queue;
a controller adapted to decrease a number of images of the first print job in queue appointed to the photoreceptor or belt to less than a total number of images that the photoreceptor or belt can hold, the controller further adapted to execute the second print job contemporaneously with the first job including maintaining holding images of the first job on the photoreceptor or belt while interleavinq images of the second print job on regions of the belt made available b the decrease; and,
a plurality of sheet outputs, wherein the sheets of the first in job are output to a first sheet output and sheets of the second print job are output to a second sheet output such that the second print job initiated in queue after the first print job is adapted to be retrieved at the second sheet output prior to completion of the first print job if the second print job is smaller than the first print job.

11. The printing system of claim 10 wherein the transfer device comprises a photoreceptor or transfer belt.

12. The printing system of claim 10 wherein the user-activated controller restores the normal queue of print jobs in the storage device upon completion of the second print job.

* * * * *